June 12, 1956 S. DAVIS 2,750,545

ELECTRO-MECHANICAL COMPUTING CIRCUITS

Filed June 14, 1951

INVENTOR.
SIDNEY DAVIS
BY Raymond A. Paquin
ATTORNEY.

United States Patent Office 2,750,545

Patented June 12, 1956

2,750,545

ELECTRO-MECHANICAL COMPUTING CIRCUITS

Sidney Davis, Brooklyn, N. Y., assignor to American Bosch Arma Corporation, a corporation of New York Application June 14, 1951, Serial No. 231,639

9 Claims. (Cl. 318—19)

This invention relates to electro-mechanical computing circuits and has particular reference to a method of using electro-mechanical resolvers without the usual booster amplifiers and wherein a precise transformation ratio and phase shift is maintained through any resolver, with constant input and output impedances.

In prior computing circuits using electro-mechanical resolves, booster amplifiers have been interposed in the connections between the output of one resolver and the input to another. The functions of the booster amplifier in this connection have been to effectively maintain the signal voltage level at a constant value and in addition, with its associated compensating circuits, to correct the phase shift in the signal as the signal voltage is transmitted through a resolver.

There are many advantages to be gained if the relatively bulky and expensive booster amplifiers heretofore necessary can be eliminated through the use of smaller, fewer, less expensive and more rugged components generally classified as impedance matching networks.

In the present invention, therefore, the voltage level of the signal is allowed to decrease and the phase shift to change each time the signal is transmitted through a resolver so that the booster amplifiers are no longer required. In this instance it is advisable to use resolvers having substantially identical transmission and impedance characteristics in the computing circuit, and to have the output and source impedances for the resolver signals standardized. The former condition is attainable by proper control during manufacture of resolvers, while the latter condition is met by the present invention.

Accordingly, all resolver windings in a chain of resolvers are terminated in the proper iterative impedance, called $Z_1$ and $Z_2$, by connecting the primary winding of one resolver to the secondary winding of another resolver, or by connecting the primary and secondary windings to impedance matching networks intended to perform one of the following functions:

(1) To terminate an unused primary winding in $Z_2$, (2) To terminate an unused secondary winding in $Z_1$, (3) To make the source impedance of the input voltage equal to $Z_2$, (4) To make the output impedance of the last resolver equal to $Z_1$ or (5) To make the voltage level and phase of the input voltage to one primary winding correpsond to the voltage level and phase of the input voltage to the other primary winding of the same resolver.

For a more complete understanding of the invention, reference may be had to the accompanying drawings, in which Fig. 1 shows an electro-mechanical resolver terminated in $Z_1$ and $Z_2$, and Fig. 2 is a schematic diagram of a typical computing circuit.

Figure 1:
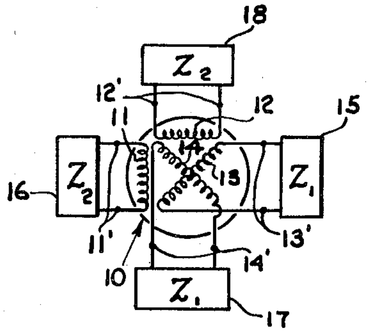

Referring to Fig. 1, a resolver 10 having primary or stator windings 11, 12 terminated in impedance 16, 18 respectively of value $Z_2$ and secondary or rotor windings 13, 14 terminated in impedances 15, 17 respectively of value $Z_1$ is shown.

Theoretical study of electro-mechanical resolvers shows that the input impedance, i. e. impedance at terminals 11′ looking towards resolver 10, is constant for all positions of rotor windings 13, 14, and the source impedance at terminals 13′, i. e. the impedance looking towards the resolver 10, is also constant for all positions of the resolver rotor when the resolver primary windings are both terminated in a constant and equal impedance, and the secondary windings are also both terminated in a constant and equal impedance.

The values of $Z_1$ and $Z_2$ may be chosen so that the input impedance at terminals 11′ is equal to $Z_1$ while the source impedance at terminals 13′ is equal to $Z_2$, and similarly, the input impedance at terminals 12′ is $Z_1$ while the source impedance at terminals 14′ is equal to $Z_2$. By classical definition, these impedances are known as the iterative impedances.

The transmission of a signal voltage through a resolver is accomplished with some attenuation and phase shift when the secondary winding is connected to the finite impedance $Z_1$.

The ratio of input voltage at terminals 11′, for example, to the output voltage at terminals 13′ in the condition of maximum coupling between the windings 11 and 13 may be expressed as the complex number $k\underline{/\theta}$ which in this description will be known as the propagation factor of the resolver. The ratio $k\underline{/\theta}$ indicates a change in amplitude, represented by $k$, and a change in phase, represented by $\theta$. It may be assumed that in a well constructed resolver the propagation factor between either primary winding and either secondary winding is the same. Thus, the propagation factors between windings 11 and 14, 12 and 13 and 12 and 14 are also equal to $k\underline{/\theta}$.

The properly terminated resolver may therefore be regarded as an electrical network having iterative impedances of $Z_1$ and $Z_2$ and a propagation factor of $k\underline{/\theta}$, and it will be seen that any number of such resolvers may be connected in a series chain without undesirable loading effects and without requiring booster amplifiers for successful operation.

Figure 2:
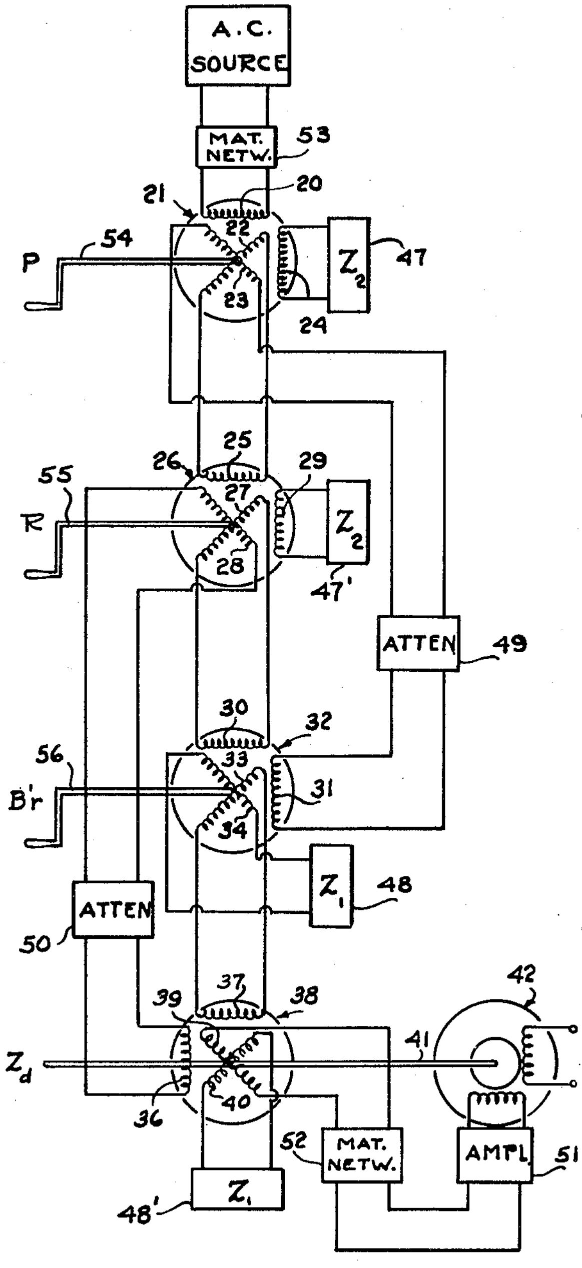

With reference now to Fig. 2, which shows in part a spherical coordinate transformation system for changing roll and pitch angles into level and cross level angles and the mathematics of which are contained in copending application Serial No. 600,605, filed on June 20, 1945 by George Agins, the present invention will be described.

In the chain of four resolvers 21, 26, 32 and 38 the secondary windings 22 and 23 of resolver 21 energize primary winding 25 of resolver 26 and primary winding 31 of resolver 32 respectively. The respective secondary windings 27 and 28 of resolver 26 energize primary winding 30 of resolver 32 and primary winding 36 of resolver 38. Secondary winding 33 of resolver 32 energizes primary winding 37 of resolver 38, while the output signal of secondary winding 39 of resolver 38 is applied to amplifier 51 and a constant alternating voltage source G energizes primary winding 20 of resolver 21.

The secondary windings 22, 23 of resolver 21 are driven by shaft 54 which is displaced through the angle of pitch, P, the secondary windings 27, 28 of resolver 26 are displaced through the angle of roll, R, by shaft 55 and the secondary windings 33, 34 of resolver 32 are displaced through the angle B′r (relative bearing) by shaft 56. In accordance with the mathematics of the problem as described in the co-pending application previously referred to, the primary windings 36, 37 are energized by signals proportional in amplitude to cos L cos $Z_d$ and cos L sin $Z_d$ respectively.

The signal thus induced in secondary winding 39 energizes control field winding 43 of motor 42 through amplifier 51, so that motor 42 drives rotor winding 39, by means of shaft 41, to the non-inductive position and the displacement of shaft 41 is proportional to $Z_d$, the cross-level angle.

The signals to the primary windings are commonly supplied by booster amplifiers to reduce the loading effects on secondary windings supplying these signals, but the present invention eliminates the necessity for such amplifiers by supplying each resolver signal from a source having an impedance $Z_2$, and by feeding each output of each resolver into an impedance $Z_1$.

Thus, a network of impedance $Z_2$ is connected across each unused primary winding, viz. windings 24 and 29 of resolvers 21 and 26 respectively, and a network of impedance $Z_1$, is connected across each unused secondary winding, viz. windings 34 and 40 of resolvers 32 and 38 respectively.

The constant alternating voltage energizing primary winding 20 must be supplied from a source having an impedance $Z_2$ and to this end impedance matching network 53 is inserted between the supply source, G, and winding 20, to thereby transform the impedance of source G into a value equal to $Z_2$.

Also, the impedance to which the signal of second winding 39 is supplied must be $Z_1$, and to transform the input impedance of amplifier 51 to $Z_1$ (if it is other than $Z_1$) the network 52 is interposed in the leads between secondary winding 39 and the input to amplifier 51.

The attenuation network 49 is required in order to reduce the voltage level at primary winding 31 to that of primary winding 30. Since the signal voltage supplied to primary winding 31 is transmitted through resolver 21 its voltage level and phase angle may be said to correspond to $k\underline{/\theta}$. However, the voltage supplied to primary winding 30 is transmitted through two resolvers 21 and 26, so that its voltage level and phase angle corresponds to $k^2\underline{/2\theta}$, in order to successfully combine these signals in resolver 32, the voltage levels and phase angles must be the same. Therefore, attenuation network 49, having iterative impedances equal to $Z_1$ and $Z_2$ and a propagation factor of $k\underline{/\theta}$, is utilized to make the voltage level and phase angle of the signal at winding 31 correspond to the voltage level and phase angle of the signal at winding 30, $k^2\underline{/2\theta}$.

Also, attenuation network 50 similar to network 49 causes the voltage level and phase angle of the signal applied to primary winding 36 of resolver 38 to correspond to $k^3\underline{/3\theta}$ to thereby correspond to the level of the signal supplied to primary winding 37 by resolver 32.

In this circuit then, all resolvers are terminated in their iterative impedances so that a constant impedance is presented to each secondary winding no matter what the coupling of the succeeding resolver may be to preclude undersirable loading effects and yet obtain optimum transmission of the signal through the chain of resolvers.

Figure 3:
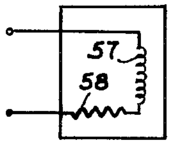
Fig. 3 is a typical termination network.
Figure 4:
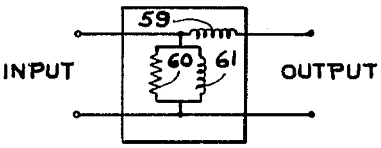
Fig. 4 is a typical attenuation network.
Figure 5:
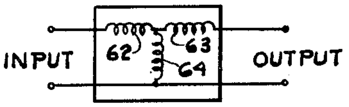
Fig. 5 is a typical impedance matching network.

Figures 3, 4 and 5 illustrated representative circuits of the various networks discussed previously. Fig. 3 is a typical circuit for the $Z_1$ and $Z_2$ networks 48 and 47 respectively, and is shown as comprising the series connected inductance 57 and resistance 58. Fig. 4 represents an approximate equivalent network for a transformer and illustrates the general construction of the attenuation network. The network is composed of series inductance 59 and a shunt impedance comprising resistor 60 and inductance 61. Fig. 5 shows a T network containing three impedances 62, 63, 64, here shown as inductances, which network typifies the matching networks 52 and 53.

It should be realized that the circuits shown in Figures 3, 4 and 5 are merely illustrative or suggestive and should not be construed as limiting the invention to these circuits. Those skilled in the art can readily propose numerous other circuits having the desirable required characteristics which are made up of a different configuration of electrical elements. The accuracy demanded of the circuit will, to some extent, affect the complexity of the proposed networks so that the networks may not always be as simple as those shown.

I claim:

1. In an electro-mechanical computer circuit, a chain of resolvers comprising a plurality of electrically interconnected resolvers, the resolver windings in said chain of resolvers being terminated in iterative impedances whereby the use of booster amplifiers between the output of one resolver and the input to another resolver is not necessary.

2. A device as set forth in claim 1 in which the proper iterative impedance in which the resolver windings are terminated is obtained by connecting the primary winding of one resolver to the seocndary winding of another resolver.

3. A device as set forth in claim 1 in which the proper iterative impedance in which the resolver windings are terminated is obtained by connecting the primary and secondary windings to impedance matching networks.

4. A device as set forth in claim 1 in which the proper iterative impedance in which the resolver windings are terminated is obtained by connecting the primary and secondary windings to impedance matching networks to terminate an unused primary winding in an impedance of such value that the use of booster amplifiers between the output of one resolver and the input to another resolver is not necessary.

5. A device as set forth in claim 1 in which the proper iterative impedance in which the resolver windings are terminated is obtained by connecting the primary and secondary windings to impedance matching networks to terminate an unused secondary winding in an impedance of such value that the use of booster amplifiers between the output of one resolver and the input to another resolver is not necessary.

6. A device as set forth in claim 1 in which the proper iterative impedance in which the resolver windings are terminated is obtained by connecting the primary and secondary windings to impedance matching networks to make the source impedance of the input voltage of such value that the use of booster amplifiers between the output of one resolver and the input to another resolver is not necessary.

7. A device as set forth in claim 1 in which the proper iterative impedance in which the resolver windings are terminated is obtained by connecting the primary and secondary windings to impedance matching networks to make the voltage level and phase of the input voltage to one primary winding correspond to the voltage level and phase of the input voltage to the other primary winding of the same resolver.

8. A device as set forth in claim 1 in which the proper iterative impedance in which the resolver windings are terminated is obtained by connecting the primary and secondary windings to impedance matching networks to make the output impedance of the last resolver equal to the input impedance.

9. In an electro-mechanical computer circuit, a chain of resolvers, each of said resolvers having a pair of primary windings and a pair of secondary windings, electrical connections between the secondary windings of certain of said resolvers to the primary windings of others of said resolvers, impedance means connected to each of the unused primary windings of said resolvers, second impedance means connected to each of the unused secondary windings of said resolvers, attenuation means connected between the secondary windings of certain of said resolvers and the primary windings of others of said resolvers whereby the use of booster amplifiers between the output of one resolver and the input of another resolver is not necessary.

References Cited in the file of this patent

UNITED STATES PATENTS

| | | |
|---|---|---|
| 2,463,687 | Gitters | Mar. 8, 1949 |
| 2,511,614 | Agins et al. | June 13, 1950 |

OTHER REFERENCES

"Radio Engineers Handbook," Terman, McGraw-Hill Book Co., pp. 206–208.